INVENTOR.
ROBERT G. WILSON
BY
ATTORNEY

Aug. 1, 1967   R. G. WILSON   3,333,529
OVEN SUPPORTS
Filed Dec. 20, 1963   3 Sheets-Sheet 2

INVENTOR.
ROBERT G. WILSON
BY
ATTORNEY

Aug. 1, 1967  R. G. WILSON  3,333,529
OVEN SUPPORTS
Filed Dec. 20, 1963  3 Sheets-Sheet 3
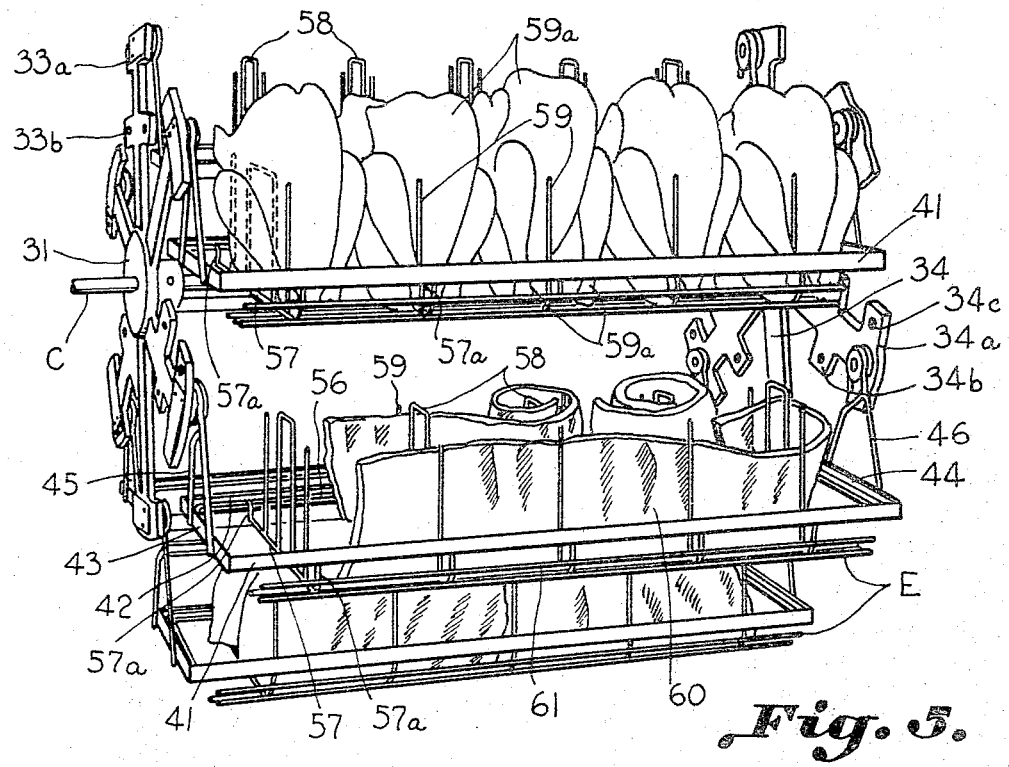
Fig. 5.
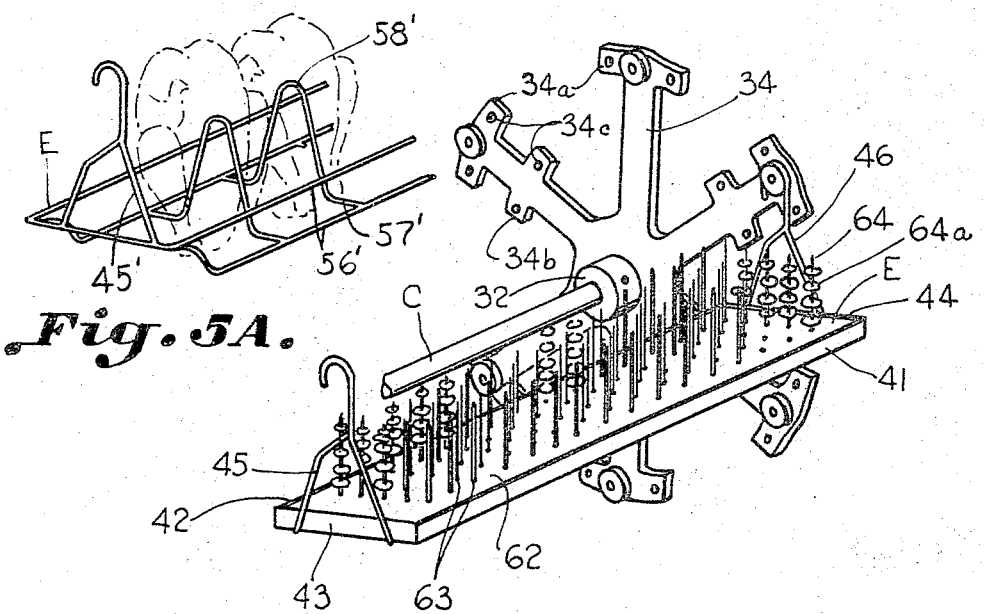
Fig. 5A.
Fig. 6.
INVENTOR.
ROBERT G. WILSON
BY
ATTORNEY

United States Patent Office 3,333,529
Patented Aug. 1, 1967

3,333,529
OVEN SUPPORTS
Robert G. Wilson, 643 E. Faris Road,
Greenville, S.C. 29605
Filed Dec. 20, 1963, Ser. No. 332,223
6 Claims. (Cl. 99—339)

This invention relates to oven supports for commercial type barbecue machines and pie baking machines.

Heretofore, commercial ovens of the type used in supermarkets for preparing barbecue have included spits upon which it is necessary for the operator to impale the meat to be cooked. Pie baking machines have made use of depending trays pivotally carried by rotating support means so that the trays carrying the pies are always level. The positioning of meat by impaling it upon spits is somewhat difficult for the operator to accomplish and hence, efforts to make sales of this item tend to be promoted less vigorously than they might if a simpler meat positioning means were provided. The trays for baking pies have normally been useless as meat cooking devices, thus limiting the use of a pie baking machine exclusively to the pastry field.

Accordingly, it is an object of this invention to provide improved, more versatile edible supporting means for commercial ovens.

Another important object of the invention is to provide a tray arrangement suitable for cooking meat or pastries.

Another object of the invention is to provide a meat support for commercial barbecue machines in which it will be unnecessary to impale the meat upon spits.

Another object of the invention is the provision of a versatile oven support for pastries and meat.

Another important object of the invention is to provide a support means which is adjustable for cooking various sizes of meats and for supporting tray assemblies.

Another important object of the invention is the provision of a rack for the easy positioning of meats, such as chickens and spare ribs, for cooking and for removal from the oven.

Still another object of the invention is the provision of a tray assembly for positioning shish-kebobs for cooking.

The construction designed to carry out the invention will be hereinafter described, together with other features thereof.

Figure 1:
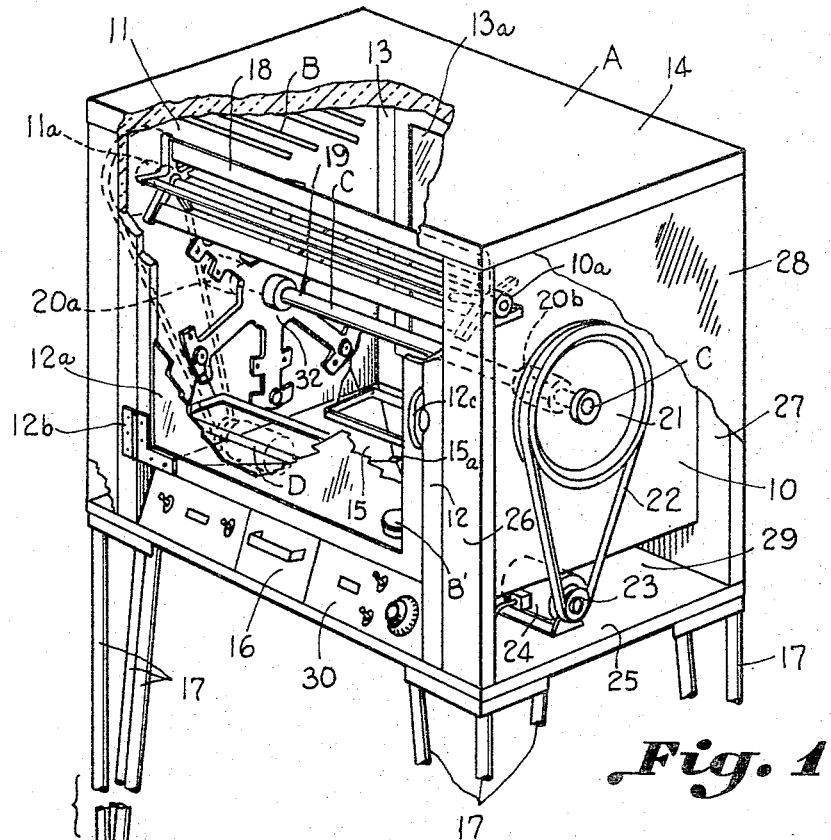
Figure 2:
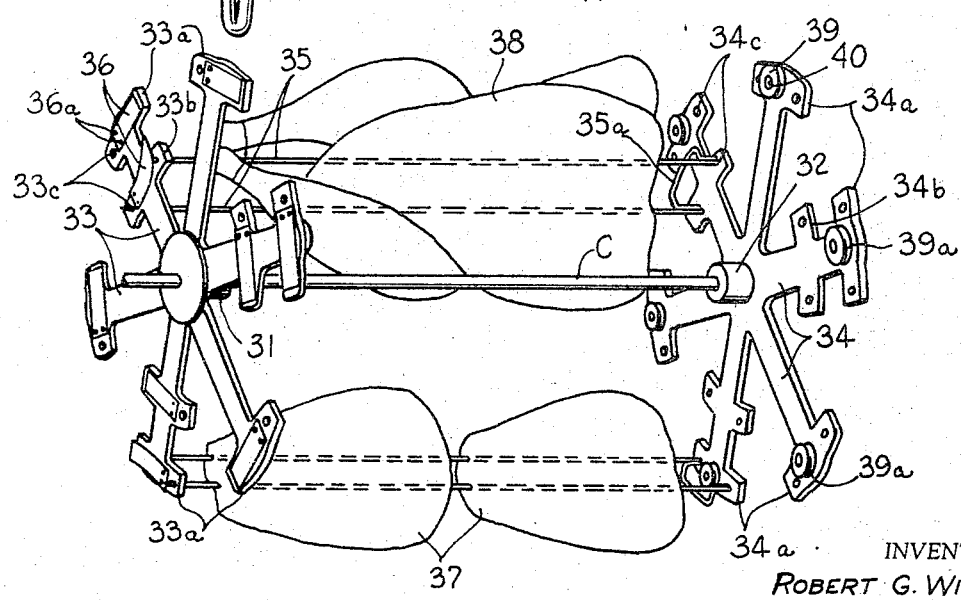
Figure 3:
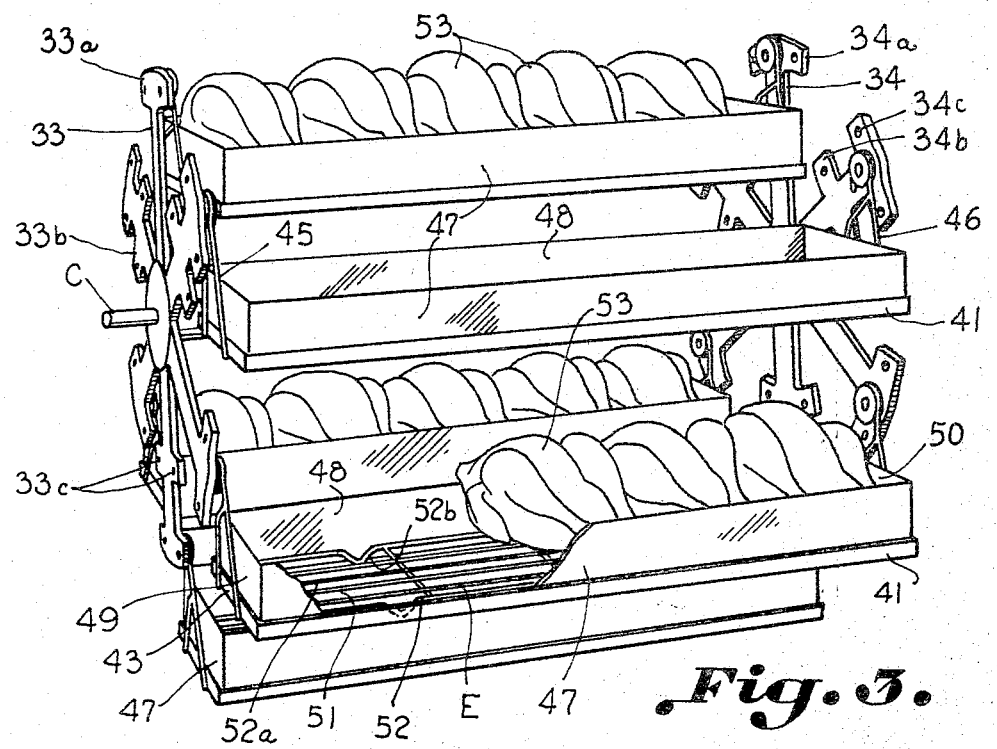
Figure 4:
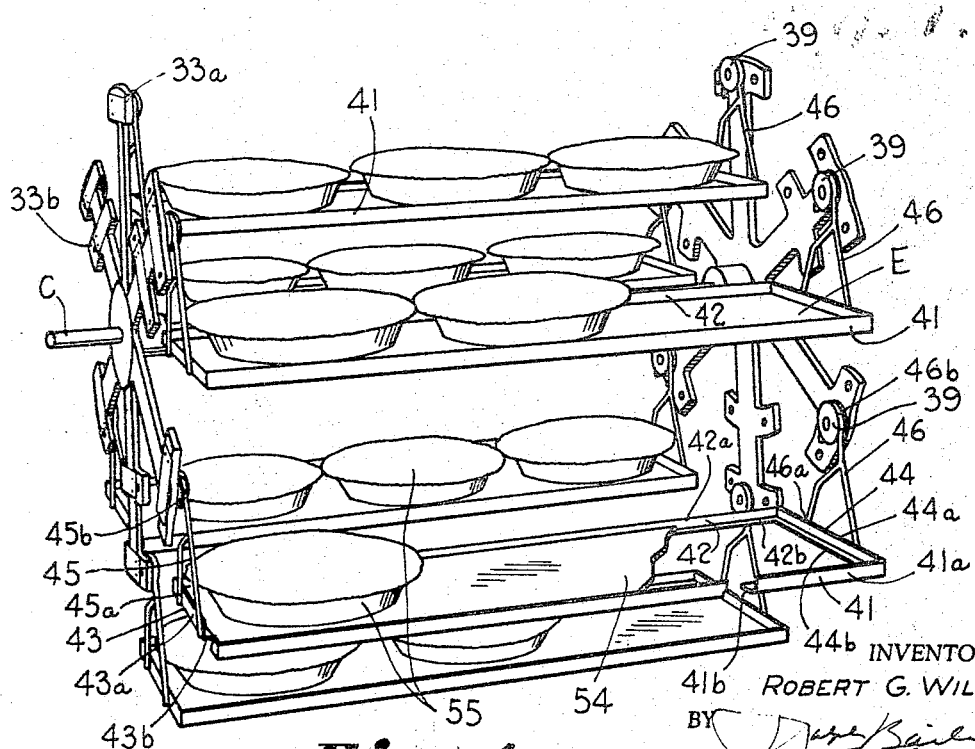

The invention will be more readily understood from a reading of the following specification and by reference to the accompanying drawings forming a part thereof, wherein an example of the invention is shown and wherein:

FIGURE 1 is a perspective view illustrating an oven accommodating supports constructed in accordance with the present invention, FIGURE 2 is a perspective view illustrating an oven support constructed in accordance with the present invention, FIGURE 3 is a perspective view illustrating a modified form of oven support in accordance with the present invention, FIGURE 4 is a perspective view illustrating another modified form of support in accordance with the present invention, FIGURE 5 is a perspective view illustrating another modified form of support in accordance with the present invention, FIGURE 5A is a perspective view illustrating another modified form of support in accordance with the present invention, and FIGURE 6 is a perspective view illustrating another modified form of the invention in which the tray is adapted to carry shish-kebobs for cooking.

The drawings illustrate an edible supporting means for use in an oven A which has electrical heating means B extending substantially across the upper portion thereof. The oven has insulated walls in which a supporting assembly C is journaled so as to be positioned in the central portion of the oven below the heating means. Suitable power operated means continuously rotate the assembly. The assembly C has hub means carried thereby supporting a plurality of radially extending arms. The arms have a plurality of spaced means for suspending trays D therefrom. The arms are also suitable for carrying spits in spaced apertures carried adjacent the ends of the arms. The meat supports in the form of the trays D each carries a rack E therein as will be described in greater detail below.

FIGURE 1 illustrates an oven A which has a pair of insulated side walls 10 and 11. A front wall 12 and a rear wall 13 have glass doors 12a and 13a, respectively, therein so that the edibles being cooked may be viewed from either the front or the back of the oven. The doors 12a and 13a are each provided with hinges 12b on one side thereof, and a latching means 12c on the other side thereof, such hinge and latch means being shown on the door 12a only. The oven A has an insulated top 14 and a suitable bottom 15. A central opening 15a is provided for collecting grease drippings and the like, and these are conducted into the drawer 16 for removal from the oven. The entire oven is suitably supported on legs 17.

The oven A has electrical heating means B therein extending substantially across the upper portion of the oven. A centrifugal impeller or fan 18 is journaled at each end thereof, into the walls 10 and 11 as at 10a and 11a, respectively. The oven and the centrifugal impeller are of the types described in detail in applicant's copending application filed Dec. 6, 1962, bearing Ser. No. 242,792, and now Patent No. 3,214,566.

A shaft 19 is journaled in the opposite walls 10 and 11 in the central portion of the oven below the heating means. The shaft 19 is mounted for rotation in suitable bearings 20a and 20b. The shaft 19 carries a pulley 21 on one end thereof for driving a belt 22. The belt 22 is driven by the power takeoff 23 of the motor 24. The entire driving assembly just described is supported on a platform 25 extending outwardly from one side of the oven. The platform 25 forms a part of a housing therefor, which includes front and rear walls 26 and 27, and outside wall 28. The top 14 extends as a cover for the upper portion of the compartment, while the side wall 10 serves as an inside wall. It wil be noted that the motor extends beneath the bottom of the oven 15 into a recessed portion 29 of the housing just described. The front wall 12 has an insulated panel portion 30 extending downwardly thereof and defines a part of the recessed portion 29.

The shaft 19 has hub-like members 31 and 32 adjacent each end thereof within the oven. The hub member 31 carries a plurality of spaced radially extending arms 33, while the hub member 32 carries a plurality of similar radially extending arms 34. It will be noted that every radially extending arm 33 carries a first transverse bracket 33a adjacent its end, and that every other arm 33 carries an intermediate transverse portion 33b. Similarly each arm 34 carries a first transverse portion 34a, while every other such arm carries an intermediate transverse portion 34b. It will be obseved that spits having a pair of parallel prongs 35 are positioned between the intermediate transverse portions or between the first transverse portions, depending upon the size of the piece of meat to be carried thereby.

Each of the spits 35 has a handle 35a which bridges and joins the spits at one end. The free ends of the prongs 35 adjacent the handle 35a are carried by apertures 34c which are spaced and carried in each of the transverse portions 34a and 34b. The free end of the prongs 35 are carried by apertures 33c which are spaced within each of the transverse portions 34a and 34b. It will be noted that the transverse portions each have a spring element 36 constructed of spring steel which is carried as by rivets 36a. The spring member 36 are positioned so as to bear against at least one of the free ends of the prongs 35 to urge the spits into fixed position between the arms 33 and 34. By reference to FIGURE 2 it will be noted that hams 37 which are relatively small may be positioned upon spits between the end transverse members 33a and 34a, while a large piece of meat such as a turkey 38 must be positioned between the intermediate transverse portions 33b and 34b. Such large pieces of meat would be spaced between every other arm, and by virtue of being placed closer to the shaft 19, avoids contact with the oven wall during its passage within the oven.

A mounting means for trays is provided in the form of freely rotatable elements 39 mounted on the inner faces of the outer transverse portions 34a and 33a, only those on transverse portions 34a being shown. These members 39 are mounted upon a stub shaft 40 carried by the transverse members 33a and 34a. The members 39 have an annular groove 39a about their outer periphery to accommodate the means for suspending the tray as is best shown in FIGURES 3, 4, 5 and 6. These figures illustrate an embodiment of the invention which a substantially rectangular open frame is formed by angle members, the sides being designated at 41 and 42. The sides 41 and 42 have vertical legs 41a and 42a and inwardly facing legs 41b and 42b. A pair of opposed end portions 43 and 44 have vertical legs 43a and 44a and inwardly disposed legs 43b and 44b. The substantially rectangular open frame thus formed is suspended from standards 45 and 46 which are attached at one end thereof as at 45a and 46a. Each of these standards have a looped portion 45b and 46b, respectively, which are carried within the annular grooves 39a within the rotatable mountings 39.

Referring now to FIGURE 3, it will be noted that a substantially rectangular tray formed by sides 47 and 48, ends 49 and 50, and a bottom 51 are positioned within the rectangular open frames described above. Each of these trays have wire racks 52 therein. The wire racks 52 include an upper frame portion 52a and a plurality of spaced downwardly extending legs formed by suitable bends in the wire 52b so that the upper frame 52a is spaced from the bottom of the tray 51. A number of chickens as illustrated at 53, for example, may be placed upon the racks 52. If desired, the chickens may be stuffed and served hot from the oven at the conclusion of cooking. If desired, the heat may be turned down so that the heating elements B emit sufficient heat to maintain the oven at a given temperature for warming the edibles to be served, thus giving added customer appeal. Thus, the food may be served hot from the oven at all times.

The trays illustrated in FIGURE 4 include a flat metallic tray portion 54 therein upon which the pies illustrated at 55 may be placed for cooking in the oven. If desired, the pies 55 may also be served hot from the oven.

FIGURE 5 illustrates a wire rack which may be placed within the open trays. These wire racks include a substantially rectangular portion, constructed on wire or rod members, illustrated at 56, and a plurality of transverse frame members spaced therealong, illustrated at 57. Each of these transverse spaced portions include end portions 57a carried at each end thereof by the rectangular frame members 56. Each of the transverse frame members 57 carries an upwardly extending portion 58 which is constructed so as to fit within the body cavity of a chicken illustrated at 59. If desired, additional vertical portions 59 may be carried by the bar 57 and suitably spaced from the vertical portions 58 in order to help accommodate spare ribs as illustrated at 60. A number of longitudinal bars 61 may be fastened across the downwardly extending members 57a to further position the legs of the chicken thereon as it best illustrated at 59a in FIGURE 5.

FIGURE 5A illustrates a modified form of wire rack in which like-parts are indicated by reference characters like those of FIGURE 5 with prime notations added. The rack has a plurality of longitudinal aligned rods 56' forming side portions. A plurality of spaced transverse members 57' extend inwardly from the lower side portions. An upwardly extending portion carried intermediate the members 57' serve as edible supports. A hanger 45' is carried by a rod bridging the sides.

FIGURE 6 illustrates an edible support which fits within the open tray in the form of a plate 62. The plate 62 has a plurality of spaced openings 63 therein to accommodate a spit illustrated in the form of a wooden shish kebab spit 64. These wooden spits 64 carry the usual meat and vegetable elements which constitute a shish kebab 64a.

While a preferred embodiment of the invention has been described using specific terms, such description is for illustrative purposes only, and it is to under stood that changes and variations may be made without departing from the spirit or scope of the following claims.

What is claimed is:

1. A supporting means for edibles in an oven having electrical heating means therein and power operated means continuously moving the edible supporting means in an upright position along a path toward and away from the heating means within the oven including, a frame defining a substantially rectangular configuration formed from wire, said frame having side portions each formed by at least two longitudinally aligned vertically spaced rods, a plurality of oppositely disposed spaced transverse members extending inwardly toward the central portion of said frame from each of the lowermost rods, an upwardly extending portion interconnecting said oppositely disposed transverse members intermediate the side portions and serving as the supports for edibles, oppositely disposed end members interconnecting the respective ends of said rods, and means positioned on each of the end members connected to the power operated means.

2. The structure set forth in claim 1, wherein the end members of the frame are transversely disposed rods, and wherein the connecting means includes a hanger carried by each of the transverse rods.

3. A cooking apparatus comprising a supporting means positioned in an oven having heating means, moving means and power operated means controlling the movement thereof, said moving means continuously moving the edible supporting means in an upright position along a path toward and away from the heating means, said supporting means comprising (a) a frame having a pair of laterally spaced side members and a pair of opposed end members joining said side members defining an aperture therebetween, (b) said members having means forming a part thereof for receiving an auxiliary frame thereon to extend over said aperture, (c) means suspending said frame from said moving means, (d) said auxiliary frame including a base portion having dimensions conforming to the dimensions of said frame to be removably received on said receiving means, and (e) said auxiliary frame further including a plurality of spaced upwardly extending members secured thereto and positioned at predetermined intervals over the entire base portion of the auxiliary frame to engage and support the material to be heated.

4. The auxiliary frame of claim 3 wherein the spaced upwardly extending members are material supporting spits.

5. The auxiliary frame of claim 3 wherein the spaced upwardly extending members are comprised of a plurality of interconnected generally U-shaped elements.

6. The auxiliary frame of claim 3 wherein the base portion is formed by a plurality of spaced interconnected rod-like members.

References Cited

UNITED STATES PATENTS

| | | | |
|---|---|---|---|
| 557,759 | 4/1896 | Bonnett | 107—59 |
| 587,398 | 8/1897 | O'Conner | 107—59 |
| 1,312,833 | 8/1919 | Colias | 99—427 X |
| 1,391,835 | 9/1921 | Kerr | 107—59 |
| 1,854,850 | 4/1932 | Linkenauger. | |
| 2,085,169 | 6/1937 | Prood | 99—421 |
| 2,584,295 | 2/1952 | Sanzenbacher | 99—421 |
| 2,722,882 | 11/1955 | Wilson | 99—421 |
| 2,739,715 | 3/1956 | Planeta | 211—41 |

FOREIGN PATENTS 151,422    5/1904    Germany.

WALTER A. SCHEEL, *Primary Examiner.*

S. P. FISHER, *Assistant Examiner.*